United States Patent
Perneti et al.

(10) Patent No.: US 11,966,601 B2
(45) Date of Patent: Apr. 23, 2024

(54) HANDLING CONFIGURATION DRIFT IN BACKUP STORAGE SYSTEMS

(71) Applicant: EMC IP Holding Company LLC, Hopkinton, MA (US)

(72) Inventors: Jayanth K. Perneti, Bangalore (IN); Vinay Sawal, Fremont, CA (US); Amitha Shetty, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 245 days.

(21) Appl. No.: 17/376,488

(22) Filed: Jul. 15, 2021

(65) Prior Publication Data

US 2022/0391113 A1    Dec. 8, 2022

(30) Foreign Application Priority Data

May 27, 2021   (IN) .............................. 202111023664

(51) Int. Cl.
*G06F 3/06*   (2006.01)
*G06F 16/33*  (2019.01)

(52) U.S. Cl.
CPC .......... *G06F 3/0632* (2013.01); *G06F 3/0604* (2013.01); *G06F 3/067* (2013.01); *G06F 16/3344* (2019.01)

(58) Field of Classification Search
CPC .......................... G06F 16/3344; G06F 3/0632
See application file for complete search history.

(56) References Cited

U.S. PATENT DOCUMENTS

| | | | |
|---|---|---|---|
| 2005/0071370 A1* | 3/2005 | Altschul ............... | G06F 16/437 |
| 2020/0389369 A1* | 12/2020 | Gao ........................ | G06F 9/542 |

* cited by examiner

*Primary Examiner* — Van H Oberly
(74) *Attorney, Agent, or Firm* — Staniford Tomita LLP

(57) ABSTRACT

Embodiments for handling configuration drift in a data storage system having a plurality of storage nodes. A configuration drift manager system defines a golden configuration dataset for the data storage system, obtains a current configuration dataset of each storage node of the plurality of storage nodes, each of the golden and configuration datasets comprising a plurality of sentences defining a node configuration parameter; determines a distance between each sentence of the golden configuration dataset with each other sentence of the current configuration datasets for each of the plurality of storage nodes; ranks each node based on a distance of its sentences with the golden configuration dataset, and triggers an action on a corresponding node based on its respective ranking.

7 Claims, 9 Drawing Sheets

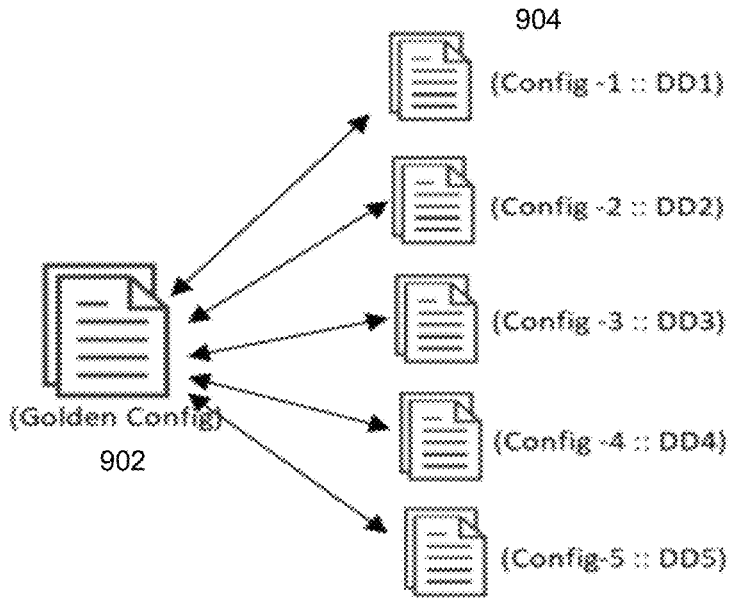
FIG. 9A
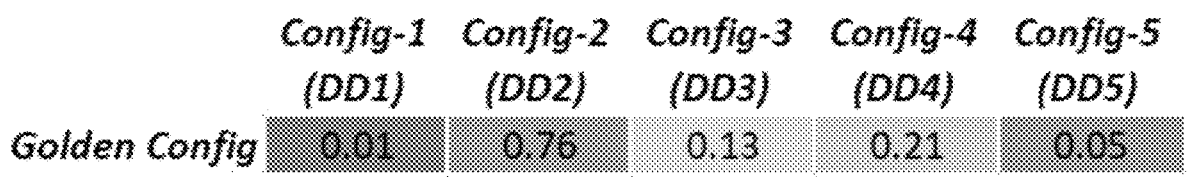
FIG. 9B
| Data Domain system | Config drift ranking |
|---|---|
| DD1 | 5 |
| DD2 | 1 |
| DD3 | 3 |
| DD4 | 2 |
| DD5 | 4 |
FIG. 9C

HANDLING CONFIGURATION DRIFT IN BACKUP STORAGE SYSTEMS

CROSS-REFERENCE TO RELATED APPLICATIONS

The present application is claims priority to Indian Patent Application No. 202111023664 filed on May 27, 2021, entitled "Handling Configuration Drift in Backup Storage Systems," and assigned to the assignee of the present application.

TECHNICAL FIELD

Embodiments are generally directed to large-scale backup systems, and more specifically to compensating for configuration drift in backup storage systems.

BACKGROUND

Data protection comprising backup and recovery software products are crucial for enterprise-level network clients. Customers rely on backup systems to efficiently back up and recover data in the event of user error, data loss, system outages, hardware failure, or other catastrophic events to allow business applications to remain in service or quickly come back up to service after a failure condition or an outage. Secure and reliable backup processes form the basis for many information technology (IT) services.

One major issue that customers face in a storage environment is managing the storage systems themselves. While there are many sub-categories for this problem, one important use case is configuration drift in storage systems. After the storage systems are deployed in the customer premises, here can be a significant configuration drift over time on these systems. This can result in customers are going beyond the standard vendor recommendations, which can eventually lead to other complications on storage systems. One example customer use case revealed that they typically had to implement scheduled cleaning windows on the order of one to three times per year by taking a down their system and manually identifying configuration drifts on their storage systems to perform necessary corrective actions. Such activities cost this user on the order of several millions of dollars per year.

What is needed, therefore, is a backup solution that provides an efficient and cost-effective method for handling configuration drift in backup storage systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. DellEMC, NetWorker, Data Domain, Data Domain Restorer, and PowerProtect Data Manager (PPDM) are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 9A illustrates an example storage system having a number Data Domain systems each having a respective current configuration and an initial golden configuration.

FIG. 9B illustrates some normalized distances for each of the DD systems in FIG. 9A with a golden configuration.

FIG. 9C illustrates a ranking of configuration draft of the example DD systems of FIG. 9A.

DETAILED DESCRIPTION

Figure 1:
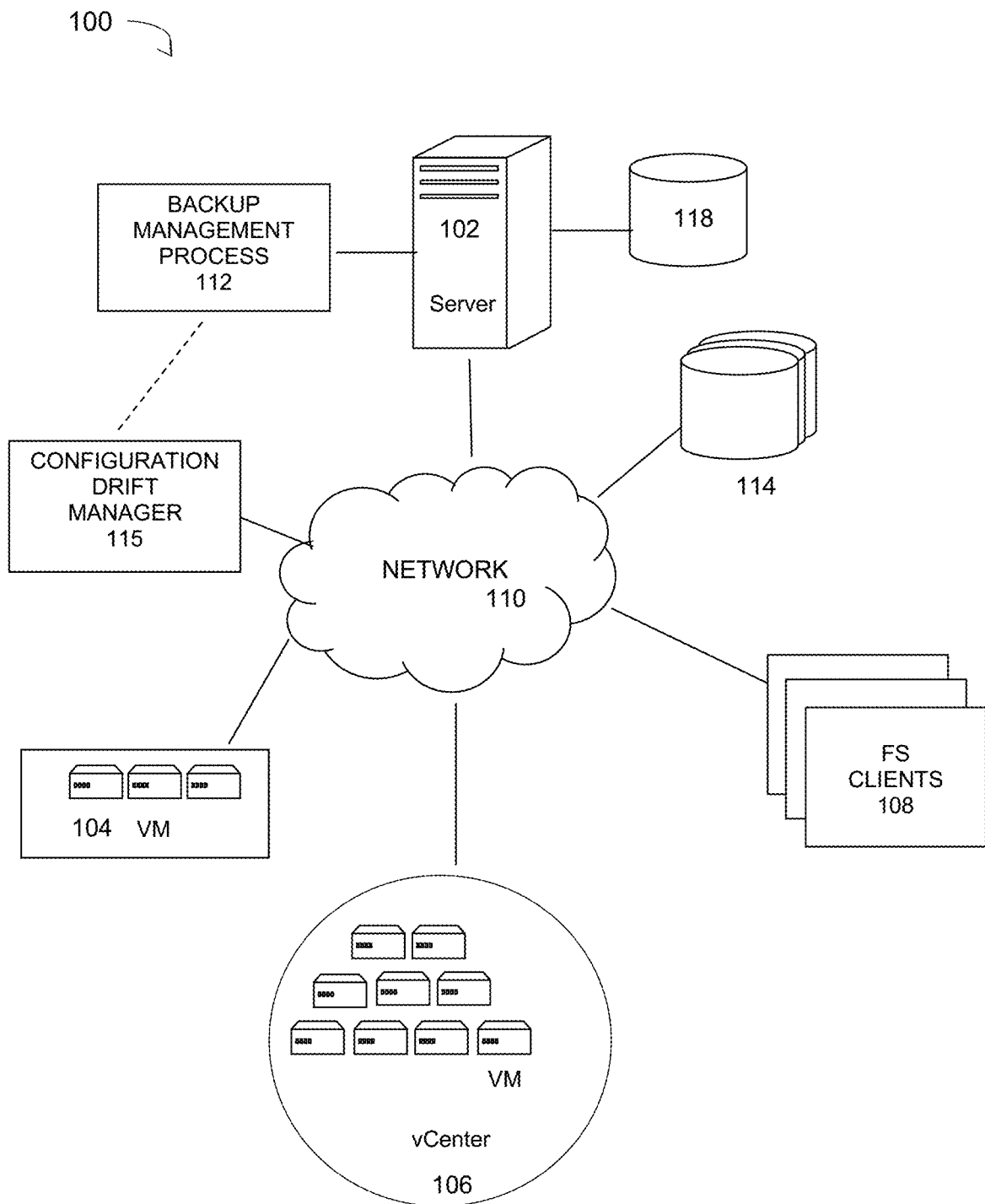
FIG. 1 is a diagram of a large-scale data backup system implementing a configuration drift management process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. The computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope.

Some embodiments involve backup techniques in a distributed system, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more processes and components for handling configuration drift in backup systems that improve upon present methods of finding and correcting configuration drift involve that rely on simple text-to-text comparisons of relevant configuration files based on original and later configurations. System 100 represents a network backup and storage system that can backup data from one or more data sources to one or more different storage media domains, such as a physical disk storage domains and virtual hard disk (VHD) domains.

As shown in FIG. 1, system 100 includes a network server computer 102 coupled directly or indirectly to the target VMs 106, and to data sources 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform.

The data sourced by system 100 may be stored in any number of other storage locations and devices, such as local client storage, server storage (e.g., 118), or network storage (e.g., 114), which may at least be partially implemented through storage device arrays, such as RAID components. Embodiments can be used in a physical storage environment, a virtual storage environment, or a mix of both, running a deduplicated backup program. In an embodiment, system 100 includes a number of virtual machines (VMs) or groups of VMs that are provided to serve as backup targets. Such target VMs may be organized into one or more vCenters (virtual centers) 106 representing a physical or virtual network of many virtual machines (VMs), such as on the order of thousands of VMs each. The VMs serve as target storage devices for data backed up from one or more data sources, such as file system (FS) clients 108, or other backup clients. Other data sources having data to be protected and backed up may include other VMs 104. The data sourced by the data source may be any appropriate type of data, such as database data that is part of a database management system. In this case, the data may reside on one or more storage devices of the system, and may be stored in the database in a variety of formats.

In an embodiment, server 102 is a backup server that executes a backup management process (backup program) 112 that automates the backup of network data using the target VM devices or the NAS (or other) storage devices. In an embodiment, the backup process uses certain known full and incremental (or differencing) backup techniques along with a snapshot backup process that is used to store an image or images of the system(s) to be backed up prior to the full or incremental backup operations.

In an embodiment, the network system may be implemented as a DellEMC PowerProtect Data Manager (or similar) data protection system. This is an enterprise-level data protection software platform that automates data backups to tape, disk, and flash-based storage media across physical and virtual environments. A number of different operating systems (e.g., Windows, MacOS, Linux, etc.) are supported through cross-platform supports. Deduplication of backup data is provided by integration with systems such as DellEMC Data Domain and other similar storage solutions. Thus, the server 102 may be implemented as a DDR Deduplication Storage server provided by DellEMC Corporation. However, other similar backup and storage systems are also possible. In a general implementation, a number of different users (or subscribers) may use backup management process to back up their data on a regular basis to virtual or physical storage media for purposes of data protection. The saved datasets can then be used in data restore operations to restore any data that may be lost or compromised due to system failure or attack.

In a typical enterprise-scale deployment, a backup user implements the storage environment in their premises (customer premises) using software and infrastructure components provided from a vendor. This typically involves the installation of many interrelated components, such as devices, device definitions, operating parameters, backup policies and rules, and so on. Upon installation and first use, an initial configuration or 'golden' configuration is defined that sets a configuration of the system with respect to optimum backup and recovery performance. At this initial stage, devices backup clients are all properly identified and associated with appropriate rules/policies, and proper storage targets are assigned based on desired backup and restore recovery time and recovery point objectives (RTO/RPO). Over time, there is typically some amount (often significant) of configuration 'drift' in the system as data and data sources change, rules and policies go out-of-date or become non-optimal, network topography (switching definitions)

changes, and so on. Configuration drift can also result in users going beyond standard vendor recommendations, which can eventually lead to other complications in storage systems.

A sample golden configuration data set can be illustrated as follows:

```
{
    "Golden": "2021-05-18",
    {
    "filesys_encryption":"enabled",
    "filesys_encryption_algorithm":"aes_256_cbc",
    "log_remote_host_list":"abc.net",
    "network_gateway":"10.198.162.5",
    "scsitgt_status":"disabled",
        . . .
    }
}
```

This example file shows some of the typical parameters defining a configuration in an example storage system, such as gateway and remote host assignments, permissions, device settings, encryption settings, and so on. The example above is provided for purposes of illustration only, and configuration parameters may be defined differently for different users and implementations. Changes or 'drift' of these configuration settings may be caused by automated processes (e.g., scripts) that change parameters, or manual changes by the user (e.g., to move data faster, extend/reduce storage periods, etc.), with a failure by the user to reset the settings back to the default settings, or other factors.

Standard current methods of addressing configuration drift typically involve simplistic text-to-text comparison methods, such as through a process in which configurations are exported to a JSON (or similar) file and then key-value pairs are compared using edit-based similarities. However, this edit-based method is not the best method to evaluate these kinds of differences. The more atomic the operations one should perform to convert one string into another in an edit-based method, the larger distance between them is observed. For example, the distance between words "hat" and "cat" is 1, and the distance between "map" and "cat" is 2. It is obvious that this approach is applicable only for words and short phrases, but is useless for longer text strings.

Another present solution is to obtain configuration drifts of a system by relying on API response comparisons. However, this method is not feasible for comparison of configurations in all cases. For example, in the case of network configurations (switches), an API may only allow the comparison of the running configuration to the startup configuration saved on the switch. If one takes a snapshot of the configuration and then uses the API to compare to that then this is straight forward. However, this is not allowed in all cases. These existing approaches work only with parallel data and fail to handle the case when there is no parallel data.

In an embodiment, the backup server 112 includes or accesses a configuration drift manager process or component 115 that uses certain latent contextual information from the system configuration and determines the distance/drift between a golden configuration (original configuration) and a present running configuration of the system to provide a basis to efficiently correct the drift conditions and return the system as near as possible to the golden configuration. Such embodiments overcome the drawbacks of the existing approaches by providing a single unified intelligent solution for end-to-end automatic handling configuration drift in backup storage systems.

In an embodiment, a configuration drift compensation process and component as part of the configuration drift manager 115 that provides a ranking based on the severity of configuration drift of all storage (e.g., Data Domain) systems in an overall environment. It automatically pushes changes for non-compliant systems, which are systems where any identified configuration drift is above a predefined threshold value. The process 115 uses an optimal transport algorithm, which is a mathematical framework that ties correspondence between instances of two datasets and distance between datasets as a whole themselves as a unified approach for identifying the configuration drift. In an embodiment, the optimal transport method is implemented using Wasserstein distance with optimal transport to intelligently handle cases in which axes are not in direct correspondence. The process compares "relations" instead of absolute positions, and is easily scalable by using Gaussian approximation. Wasserstein distance and Gaussian approximation has a closed form solution and hence no optimization is needed. It also efficiently handles the case when labels are completely unrelated (labels are represented as distributions).

Figures 2, 3:
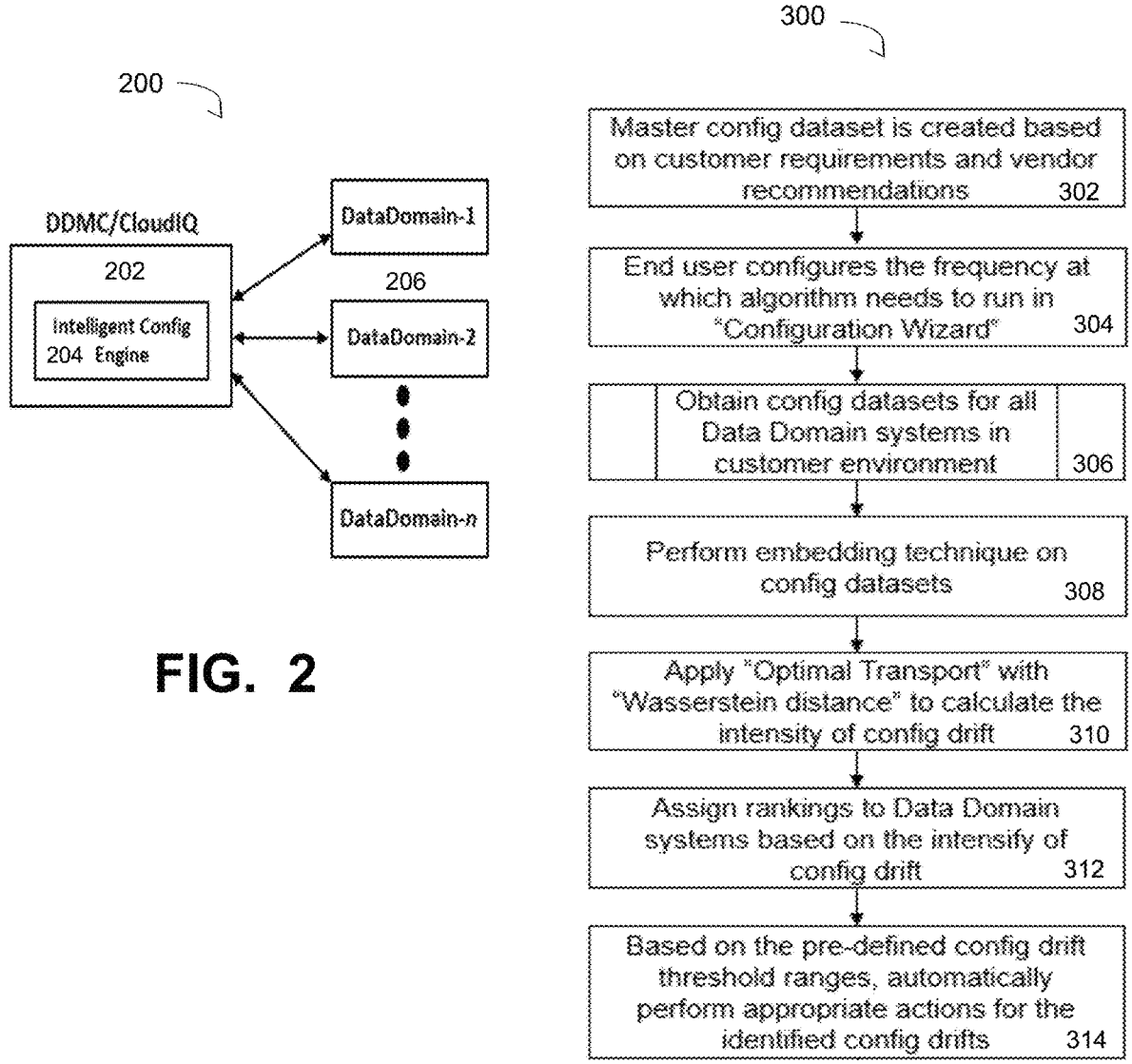
FIG. 2 is a block diagram of a storage environment implementing a configuration drift component in an intelligent configuration engine, under some embodiments.
FIG. 3 is a flowchart illustrating a method of handling configuration drift using an intelligent configuration engine, under some embodiments.

FIG. 2 is a block diagram of a storage environment 200 implementing a configuration drift component in an intelligent configuration engine, under some embodiments. System 200 includes a server computer 202, which can represent a centralized managing server, such as a Data Domain Management Center (DDMC) server that provides aggregate capacity, replication and performance management for multiple Data Domain sites 206, e.g., DataDomain 1 to n, as shown in FIG. 1. In a cloud-based network, server 200 can also run CloudIQ, which is a cloud-based portal that provides continuous health monitoring of a storage array to identify performance issues that need to be addressed through appropriate user alert mechanisms. Although embodiments are described with respect to Data Domain systems, embodiments are not so limited and any data backup system or number of systems may be used in storage environment 200. Thus, the intelligent configuration engine 204 can be part of a DDMC/CloudIQ centralized managing server, as shown, or a separate machine running in customer environment.

In an embodiment, the intelligent configuration engine 204 uses a golden image or master configuration dataset that used as a benchmark for identifying and measuring any configuration drift in system 200. This can be a master dataset with all the initial or perfect configuration settings on the storage system as per the customer requirements and vendor documentation and recommendations. A user configuration macro or wizard can also be used where users can select the frequency at which the configuration drift handling process is run, such as once a week, once month, four times a year, and so on.

With reference to FIG. 2, as an example, if a customer has 'n' DataDomain storage systems 206 in their premises 200, the intelligent configuration engine 204 will automatically export the configuration settings on each of these DataDomain systems to creates n configuration datasets (i.e., Dataset-1 for DataDomain-1, and so on). These datasets created are a labeled dataset as each configuration setting has a name associated with it. The process automatically identifies the difference between master configuration dataset and each of the Data Domain configuration dataset and assigns it a rank, where a top or higher rank (numerically) means the particular DataDomain system has more configuration drift and needs immediate attention. The process automatically invokes a process that implements correction and changes for non-compliant systems if the identified config drift is above a pre-defined threshold value.

FIG. 3 is a flowchart illustrating a method of handling configuration drift using an intelligent configuration engine, under some embodiments. Process 300 of FIG. 3 starts with a master configuration data set (golden configuration) created based on customer requirements and vendor recommendations, 302. The user configures the frequency at which the configuration drift process runs on their system, 304. The engine 204 obtains the configuration datasets for all Data Domain (or similar) storage systems in their environment, 306. The process then performs an embedding technique on the obtained configuration datasets, 308. It then applies the optimal transport algorithm with Wasserstein distance to calculate the amount or severity of configuration drift for each storage system (e.g., DataDomain-n), 310.

Once the distances for each storage system is calculated, the process assigns rankings to the systems based on the amount of configuration drift, 312. The rankings can be assigned for each storage system relative to the other storage systems, or relative to an objective measure, such as, on a scale of 1 to 10, where scores from 1-4 represent minimal drift, scores from 5-7 represent some drift, and scores from 8-10 represent serious drift. Other scales and score assignments can also be used. In such a case, a certain minimum amount of configuration drift is defined as a threshold value that identifies any degree of drift as actionable, and triggers an appropriate corrective response based on the amount of drift. Thus, as shown in step 314, based on the defined configuration drift threshold value or values, the system automatically performs any appropriate actions for the systems with at least some degree of identified configuration drift.

As shown in FIG. 2, the system 200 includes several different backup systems (DataDomain 1 to n), each of which may comprise several different individual components that require set up and management for backup operations during their lifetimes. Such components can comprise devices, such as computers, switches, data storage media, and so, as well as operating systems (OS), models, and so on. Collectively, these components may be referred to as 'devices' but it should be understood that this may also or instead include software or program element, such as models and OSs, etc. The configuration of a particular component comprises definitions contained within nodes that make up the configuration tree of components in a system.

Figure 4:
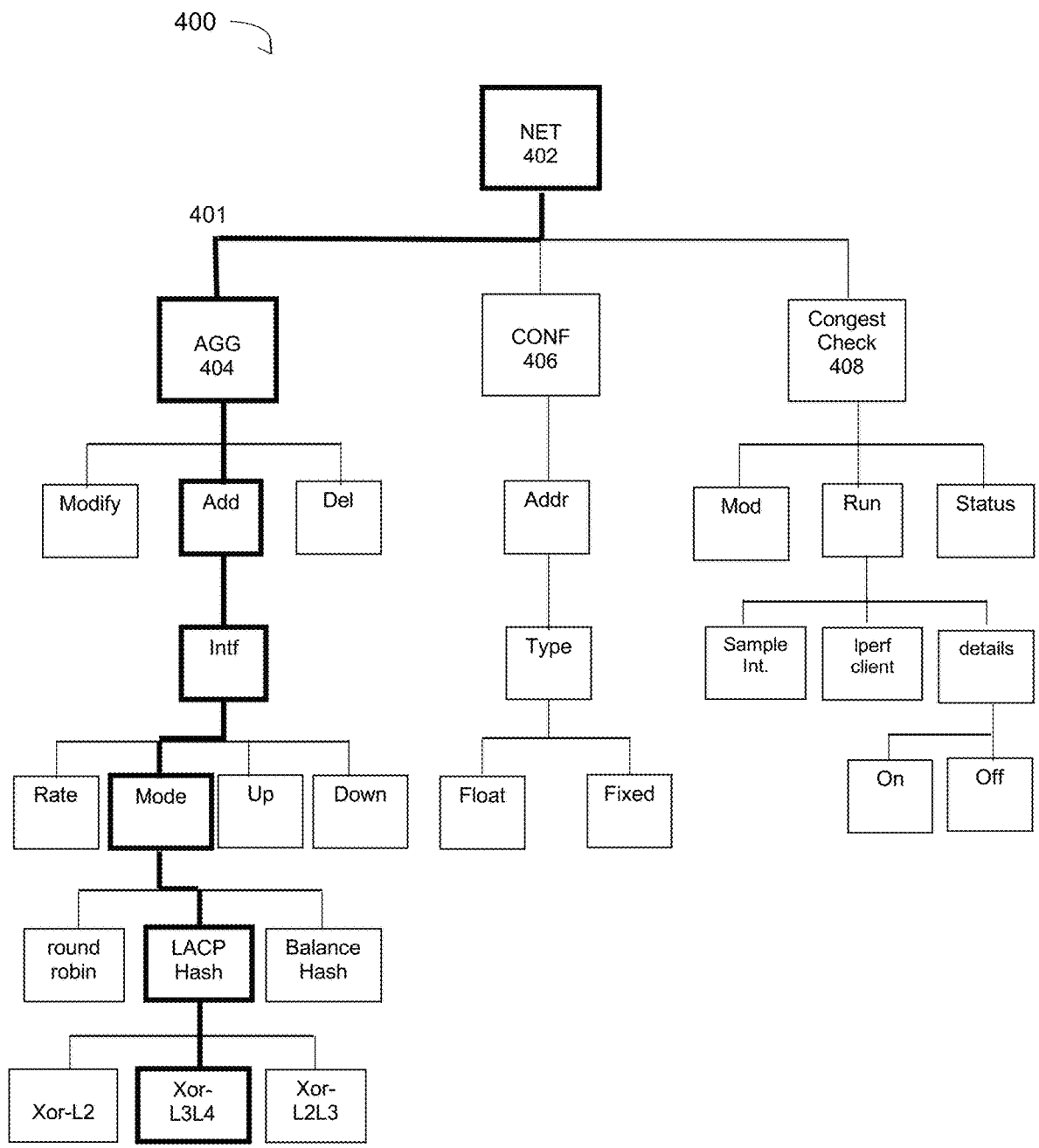
FIG. 4 illustrates an example configuration tree for components within a storage system, under some embodiments.

FIG. 4 illustrates an example configuration tree for components within a storage system, under some embodiments. Diagram 400 illustrates an example configuration graph for components from a network (net) layer 402 down to individual device levels through sub-levels aggregate (AGG) 404, configuration (CONF) 406, and Congestion Check 408, with additional sub-levels below each of these initial sub-levels to form a tree structure 400, as shown. The tree structure 400 thus comprises numerous sub-trees with sub-roots, intermediate nodes, and terminal leaves. It should be noted that FIG. 4 is provided for purposes of example only, and any other tree structure and composition may be used depending on the storage system architecture and component topography.

A configuration sentence for each of the components of the system comprises the path of valid configuration data starting from the root node all the way to the terminal leaf. The example highlighted path 401 of FIG. 4 illustrates one example of a configuration sentence for the device 'Xor-L3L4' starting from the root NET node 402. The configuration sentence for this device would be expressed as: 'net aggregate add interface mode LACP-hash Xor-L3L4'. Other configuration sentences for devices in graph 400 include 'net congestion-check run details on', and 'net aggregate add interface mode LACP-hash Xor-L2', and so on.

Figure 5:
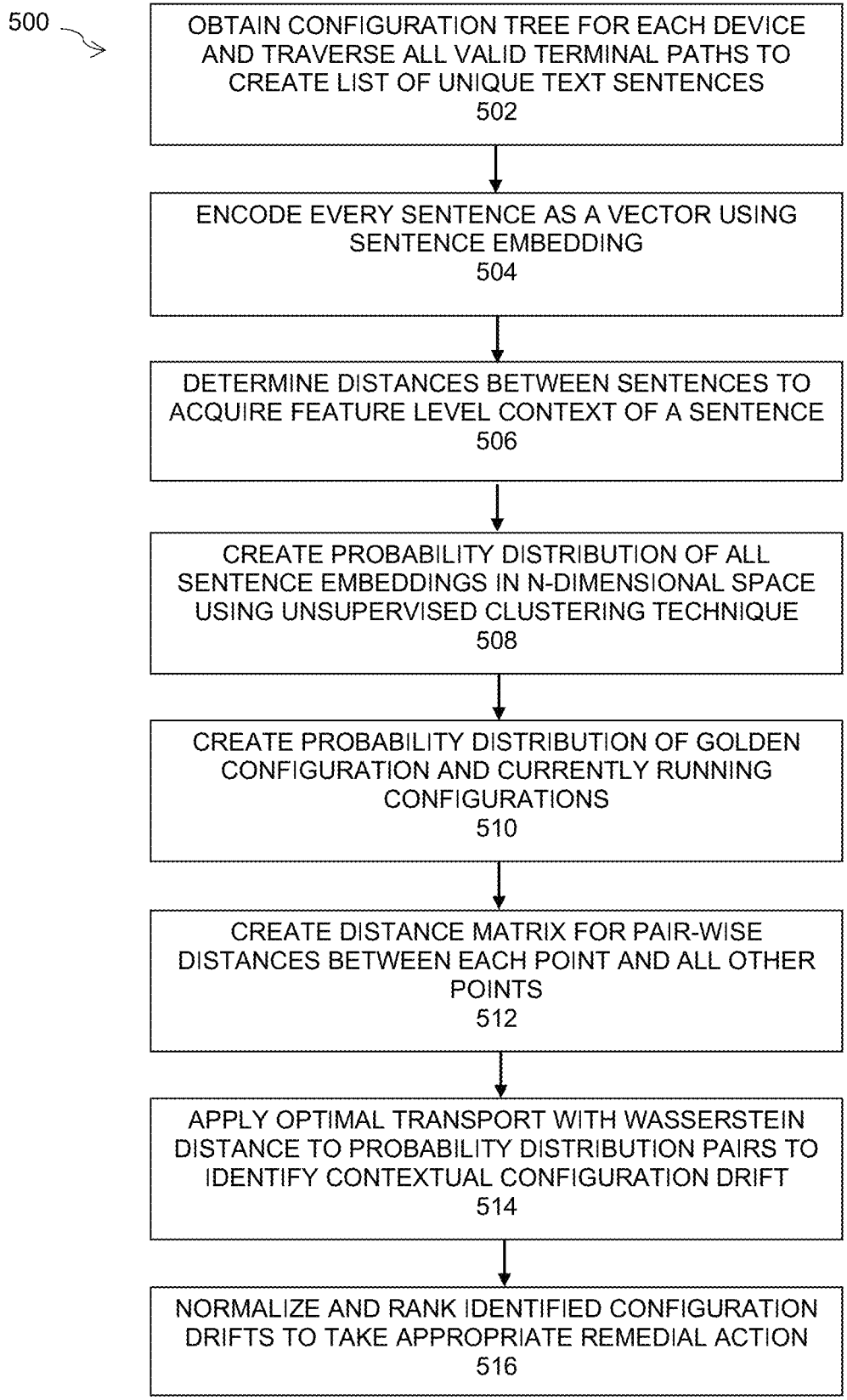
FIG. 5 is a flowchart that illustrates a method of providing configuration drift handling for components in a data storage environment, under some embodiments.

FIG. 5 is a flowchart that illustrates a method of providing configuration drift handling for components in a data storage environment, under some embodiments. For every component (device/model/OS) in each storage system 206, the process takes the configuration tree of the system and traverses all valid terminal paths from the root to all intermediate nodes and root to all leaves, 502. This will create a list of unique text sentences, such as 'net aggregate add interface mode LACP-hash Xor-L3L4', as illustrated in FIG. 4. A set of these sentences will be compiled for all of the devices of interest in each storage system.

Every configuration sentence is then encoded as a vector in n-dimensional space, using a sentence embedding technique, 504. In this n-dimensional space, every sentence has a point-value that represents its position relative to all other sentences. The distance between any two sentences can be construed as a measure of closeness between those two sentences. Using this technique, the feature level context of a given sentence is acquired by the system, 506, without requiring any manual intervention and/or rule generation.

In an embodiment, a language representation model, such as the Bidirectional Encoder Representations from Transformers (BERT) process is used to create a probability distribution of all the sentence embeddings in n-dimensional space by using unsupervised clustering technique, 508. Once the method of generating probability distribution of a system configuration is obtained, the process generates probability distributions of golden-configurations and the currently-running configuration from systems to be analyzed, 510. In an embodiment, a running configuration can be obtained at any desired time using API calls, or similar mechanisms. Such an obtained running configuration may be referred to as a 'current' running configuration.

For each distribution, the process then creates a distance matrix which represents pair-wise distance between each point and every other point, 512. It then applies an optimal transport technique with Wasserstein technique to the two probability distributions to identify the contextual configuration drift between them, 514. A traditional optimal transport assumes two spaces are registered or aligned (i.e., the axes are in direct correspondence), but this assumption fails in real world as when the axes rotate, such that the differences between datasets do not make any sense. To overcome this limitation, the process uses Wasserstein distance with optimal transport. Using Wasserstein distance metric and optimal transport techniques allows for normalization and comparison of two distance matrices. This yields a real-value score ($0.0 \leq score \leq 1.0$) that measures the distance between the two distributions. Thus, the distance between the two distributions represents the contextual drift between the golden configuration and the currently running configuration. The larger the distance between the two distributions, the bigger the configuration drift from the ideal (golden) configuration. The distances are then normalized to providing the basis of a scaled ranking scheme (e.g., a scale of 0.0 to 1.0), and an appropriate action can be taken to mitigate the effects of configuration drift, 516.

In an embodiment, a threshold value or series of threshold values can be used to define the degree or severity of configuration drift based on the distance between the current running configuration and the golden configuration. Using an example scale of 0.0 to 1.0, a score above a high threshold ($t_h \leq score \leq 1.0$) can be considered 'red' or high degree of drift; a score between the first threshold and a low threshold ($t_l \leq score \leq t_h$) can be considered 'yellow' or medium degree of draft; and a score below the low threshold ($0.0 \leq score \leq t_l$) can be considered 'green' or insignificant degree of draft. The high and low thresholds, $t_l$ $t_h$, can be set to any appropriate respective values depending on the amount of configuration drift that is tolerable for the environment. For example, if very little drift can be tolerated, the high threshold may be set to a value closer to 0.7 to 0.8, rather than closer to 0.9. Any number or values of threshold values may be defined depending on the type or types of remedial actions that can be taken. For example, if the only action is to fix any and all configuration drift problems, a single threshold value may be defined for a fix or no fix decision; whereas if two or more different remedial measures can be taken for different degrees of drift, two or more threshold values can be set to assign different bands of drift degrees can be used to trigger the different responses, such red/yellow/green, critical/bad/marginal/acceptable, and so on.

Sentence Encoding and Clustering

As shown in FIG. 5, process 500 involves certain sentence encoding and clustering steps, 504 to 508. For this step, the process learns a model that can map a sentence to a fixed-length vector. This vector encodes the meaning of the sentence and can be used for downstream tasks. As stated above, BERT is used as the model to generate a probability distribution, and the distance between two sentences indicates an amount of closeness between two sentences.

In the pretraining phase of the BERT process, Masked Language Model (MLM) and Next Sentence Prediction (NSP) are trained together, with the goal of minimizing the combined loss function of the two strategies. For NSP, in the BERT training process, the model receives pairs of sentences as input and learns to predict if the second sentence in the pair is the subsequent sentence in the original document. In a context window setup, from NSP to the context window, the process labels each pair of sentences occurring within a window of n sentences as one (1) and zero otherwise. This training paradigm enables the model to learn the relationship between sentences beyond the pair-wise proximity. After context window fine-tuning BERT on the data set, the pair-wise relatedness scores are obtained. This captures the sentence relatedness beyond similarity. By using a weighted combination of context window score and cosine similarity to measure the relationship between two sentences, the process creates a point-set representing each sentence of interest.

Once the point-set is obtained, the process utilizes an unsupervised feature clustering method to generate a distribution of configuration set. Following are the steps involved in this process:

(1) run k-means clustering algorithm with relatedness score as a similarity metric on sentences;

(2) use the sentence segments closest to each centroid as the sentence embedding candidate; and (3) repeat until convergence.

Figure 6:
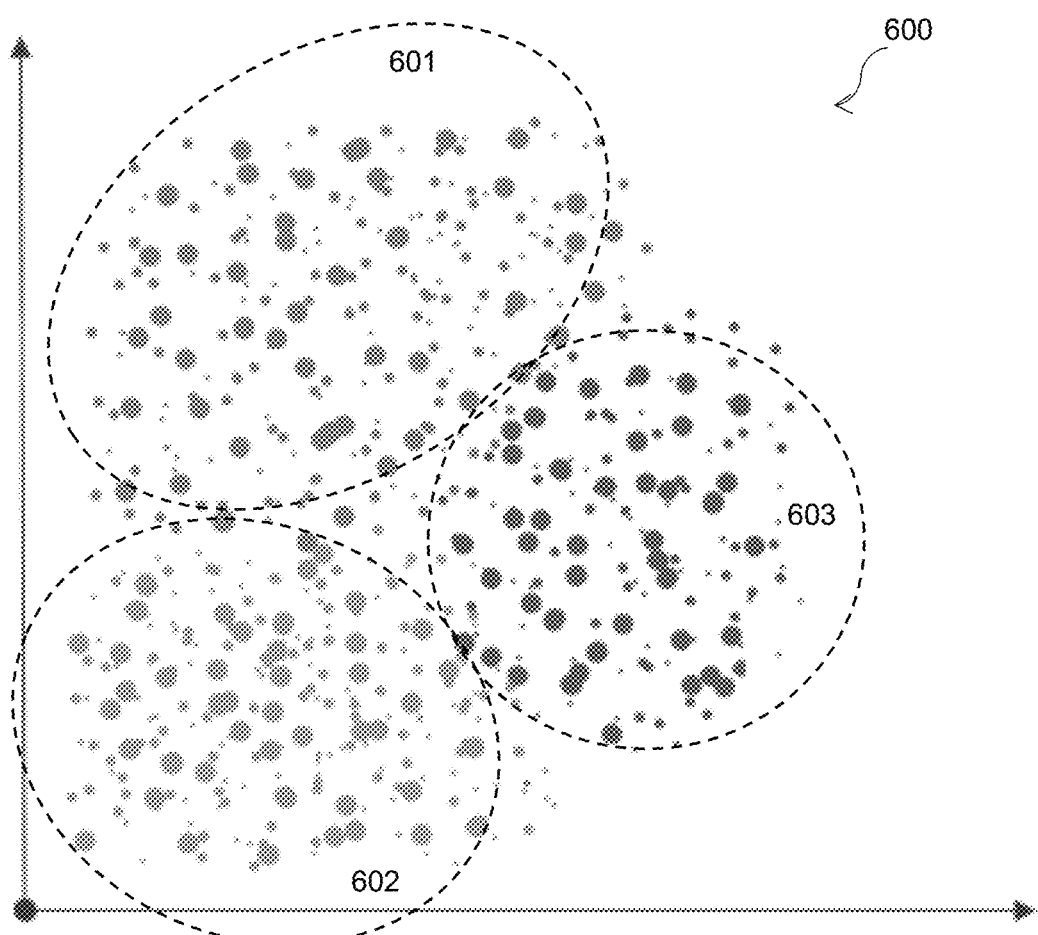
FIG. 6 shows a configuration distribution, under some example embodiments.

Once convergence is achieved, the process yields a probability distribution (PD) of the device configuration in an n-dimensional space. As an example, FIG. 6 shows a configuration distribution, under some example embodiments. For the sake of visualization, the n-dimensional space is reduced to two-dimensions for sake of illustration. The dots may be differentiated from each other based on parameters such as x-y position, size, shading/color, and/or other graphical indicators. The distribution 600 exhibits following characteristics: (1) each dot represents an encoded configuration sentence in n-dimensional space, (2) the distance between two dots within the distribution represent semantic similarity between the two sentences, (3) different shading clusters 601, 602, and 603 show groups of related sentences (dots) that are of the same shade or color. In a configuration file context, the sentences may concern standard configuration characteristics such as display/show, config, exec, and so on.

Figure 7:
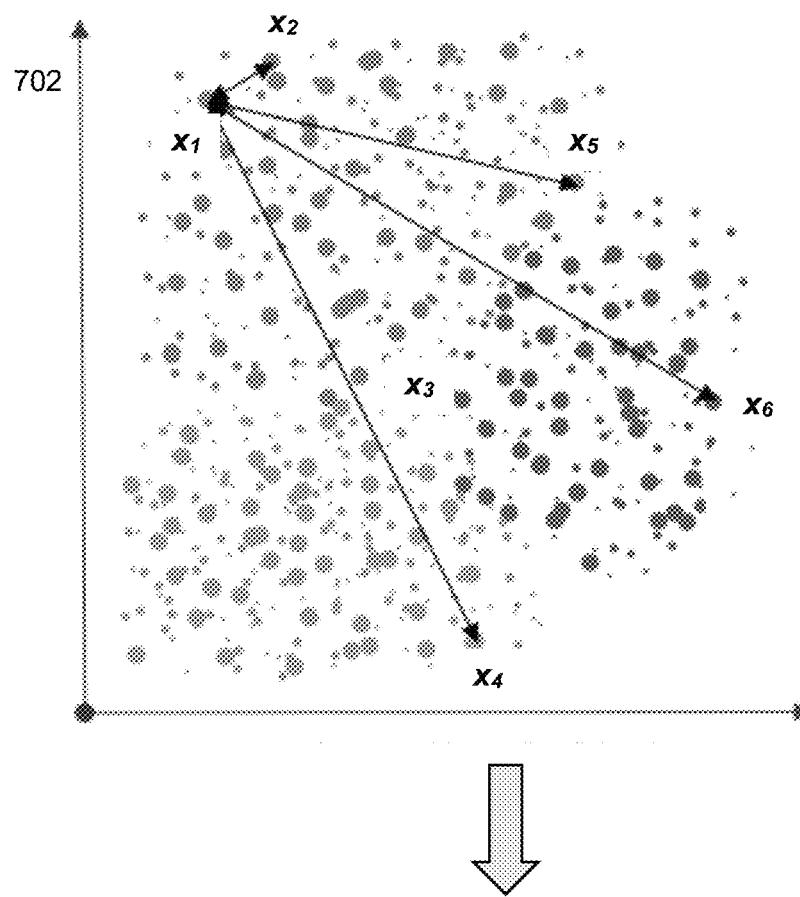
FIG. 7 illustrates the creation of a pair-wise distance matrix from a configuration distribution, under an example embodiment.
Figure 7:
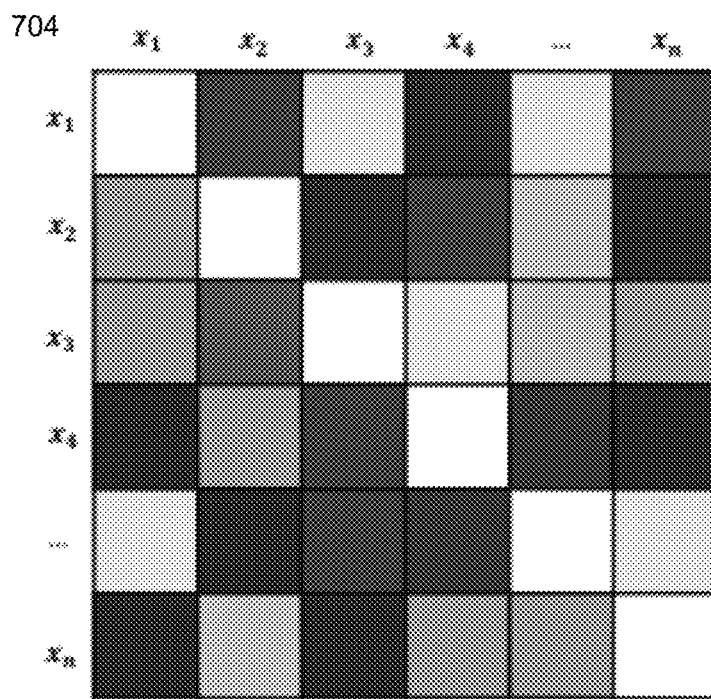

The embedding step thus converts a sentence into a vector (n-dimensional array), where every sentence is represented by a dot (e.g., in graph 600) that represents a relative position in the n-dimensional space. The point-to-point distance values are then used to create a pair-wise distance matrix to allow a direct comparison of sentences with each other. This provides distance information such as near, far, clustered and so on for each pair of sentences. FIG. 7 illustrates the creation of a pair-wise distance matrix from a configuration distribution, under an example embodiment. As shown in FIG. 7, the example configuration distribution 702 has certain labeled sentences (dots), such as $x_1$, $x_2$, $x_3$, $x_4$, $x_5$, and $x_6$. A distance is calculated between each dot and every other dot to create vectors such as $x_1$-$x_2$, $x_1$-$x_5$, $x_1$-$x_6$, and so on. These vectors are then used to create a pair-wise distance matrix 704 for each pair of dots in the configuration distribution 704.

For the example of FIG. 7, the configuration distribution matrix 704 comprises a number of shaded or colored squares where a relative shading (e.g., gray-scale from white to black) or color (e.g., red/yellow/green) provides an indication of distance between two sentences where near may be defined as white (or green) and far may be defined as dark (or red). In the example matrix 704, the distance between the same sentence (e.g., x1 to x1, x2 to x2, etc.) is shown as white (no distance) and further distances are shown as darker shades, so that the distance between x1 to x2 is medium far (gray) while the distance x1 to x4 is far (black). The matrix thus color or gray-codes the value representing the distance of one particular sentence with every other sentence. The size of the matrix depends on the number of sentences, thus a system with 10,000 sentences gives a 10 k-by-10 k matrix with encoded entries for relative distances for each sentence.

The distance relationship matrix (e.g., 704) provides way to compare two matrices, as explained in greater detail below with reference to FIG. 8. The two matrices essentially combined using a differencing function, where the process takes the distance between each point of distance matrices and then takes the differences of these distances. This yields a difference matrix that is then normalized such that an n-dimensional matrix yields a value between 0 and 1 that can then be compared with predefined threshold values to determine where along a functional scale, the difference lands, and which, in turn, can be used to trigger a response or action.

In an embodiment, a Wasserstein distance is used with the optimal transport function to take care of non-aligned probability distributions. With respect to configuration drift detection, it sometimes (though rarely) occurs that the underlying modeling of configuration changes or the definition of the golden configuration may change. The Wasserstein distance automatically compensates for such shifts.

With respect to the Wasserstein distance algorithm, formally, two empirical distributions with $\{x_1, x_2, \ldots, x_n\}$ is a member of $R^n$ and $\{y_1, y_2, \ldots, y_m\}$ is a member of $R^m$ where $x_i$ and $y_i$ are discrete points representing sentence embeddings are defined as:

$$\mu = \Sigma_i^n p_i \delta_{x_i} \text{ and } v = \Sigma_j^m q_j \delta_{y_j}$$

In the above equation, p and q are vector probability weights associated with each point-set. This representation provides "importance" to some sentences over other sentences depending on the probability of occurrence in the joint probability distribution space. For the collection of sentence embeddings, the process compares the pair-wise distances between the two distributions to create a matrix for each distribution. The process uses Wasserstein distance based optimal transport to find a minimum cost mapping between two point-sets. It then evaluates correspondence-based distances and establishes mappings between point-sets type discrete probability distributions. It then tries to align the distance matrices instead of the points. This way it compares relations instead of absolute positions.

With respect to the Wasserstein distance matrix algorithm, the cost associated with transporting a unit mass for the two empirical distributions with $\{x_1, x_2, \ldots, x_n\}$ is a member of $R^n$ and $\{y_1, y_2, \ldots, y_m\}$ is a member of $R^m$ defined in terms of Wasserstein distance (Wd) is shown below, where $r_{ij}$ is the 'mass' moved from x to y.

$$L(C_a, C_b) = Wd(C_a, C_b) = \Sigma_{ij}{}^n T_{ij} d(x_i, y_j)$$

Figure 8:
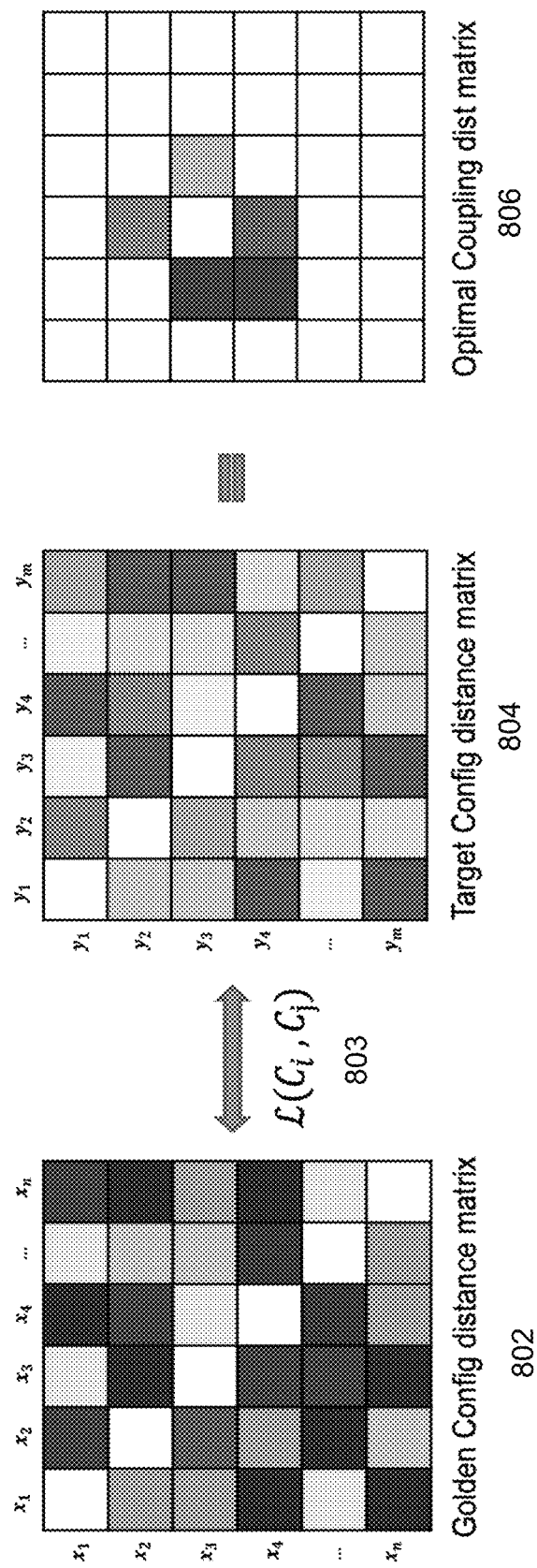
FIG. 8 illustrates a transformation of a golden configuration matrix and target configuration distance matrix into an optimal coupling distance matrix, under some embodiments.

FIG. 8 illustrates a transformation of a golden configuration matrix and target configuration distance matrix into an optimal coupling distance matrix, under some embodiments. As shown in FIG. 8, an example distance matrix for a golden configuration 802 is combined with the distance matrix for the example target configuration 804 using the Wasserstein distance function $L(C_i, C_j)$ 803 to produce the optimal coupling distance matrix 806.

The configuration drift distance for the Wasserstein distance (Wd) can be expressed as:

$$y = Wd(\text{Golden\_Config\_Dist\_Matrix}, \text{Target\_Config\_Dist\_Matrix}).$$

The value of the distance, y, is compared to one or more threshold values that determine the severity of the drift and any resulting actions that are to be taken. Table 1 below illustrates example ranges of configuration drift distance in comparison with the thresholds and appropriate actions to be taken.

TABLE 1

| CONFIG DRIFT DISTANCE | ACTION |
| --- | --- |
| $t_h \leq y \leq 1$ | Severe Drift: Automatically Push Changes |
| $t_l \leq y \leq t_h$ | Medium Drift: Send Alert to User |
| $0 \leq y \leq tl$ | Minimal Drift: No Action |

As shown for the example of Table 1, two threshold values are defined as $t_h$ (high threshold) and $t_l$ (low threshold) with values between 0 and 1 and with which the distance value y is compared. If y is below the low threshold value (e.g., close to 0) then there is minimal drift and no action need be taken; if y is between the low and high thresholds, then some drift is present and action may or may not need to be taken, and thus the user is alerted as to this condition and can decide how to proceed; and if y is above the high threshold value (e.g., close to 1), then severe drift is indicated and certain action will be taken.

The action table illustrated by Table 1 is provided for purposes of illustration only, and any number of threshold values may be used depending on how many different actions are to be triggered. The threshold values, ranges, and associated responses can be considered a hyper-parameter that is set by a system administrator depending on system configuration and requirements. The normalization function yields the range of difference y and threshold $t_x$ values, and is usually within the range of 0 to 1, as shown. The values of the thresholds, $t_x$, may be set by feature engineering practices by domain experts where operational conditions and experiences are used to determine the tolerable and intolerable amounts of drift allowed in a system.

In an embodiment, one or more threshold value ranges may yield no action or minimal actions, such as alerts. Other ranges that indicate severe drift may result in the system taking automatic action to remedy the configuration drift. Such an action may comprise pushing the golden configuration onto the current running configuration to force it to conform with the golden configuration.

With respect to a practical example, such as a Data Domain dataset system, configuration files can be automatically exported by traversing through all valid terminal paths from root to all intermediate nodes and root to all leaves. This will help to create a list of unique text sentences. FIG. 9A illustrates an example storage system having a number Data Domain systems each having a respective current configuration and an initial golden configuration. FIG. 9A illustrates an example of configurations for five different Data Domain systems 904, denoted DD1 to DD5. At any point in time, the current running configuration of these five DD systems are exported for comparison with the golden configuration file or template 902. Using the process as described above, distances between the golden and running configuration datasets are calculated through the embedding and normalization steps. FIG. 9B illustrates some normalized distances for each of the DD systems in FIG. 9A with a golden configuration. For the example of FIG. 9B are listed as follows:

First index: 0, Second index: 1, Distance: 0.01
First index: 0, Second index: 2, Distance: 0.76
First index: 0, Second index: 3, Distance: 0.13
First index: 0, Second index: 4, Distance: 0.21
First index: 0, Second index: 5, Distance: 0.05

These distances can be related as a severity of the configuration drift and these severity values can help to take automatic decisions for pushing the changes to non-compliant systems. Depending on any UI mechanisms available, this can also be illustrated via a heat map to help a user understand the severity of configuration drift especially when dealing with large number of systems, such as by using a green/yellow/orange/red or similar color-scale or grayscale, where Config-1 (DD1) and Config-5 (DD5) are green, Config-2 (DD2) is red, Config-3 (DD3) is yellow and Config-4 (DD4) is yellow or orange, and so on.

From the calculated distances, the configuration drift (when compared to the golden configuration 902) a ranking can be performed, such as shown in the example of FIG. 9C, where a top rank (higher number) means a large configuration drift is identified.

This configuration drift determination process can be configured to run at a regular interval of time (e.g., once in a week) to automatically sends the severity of configuration drift along with the ranking to end users. Automatic response actions can be assigned to different defined threshold values or ranges to trigger corresponding actions, such as shown in Table 1 above. Depending on the pre-defined threshold range in which the identified configuration drift falls under, corresponding actions are automatically performed by the algorithm. For example, for those identified configuration drifts that belongs to the red range, the process can automatically send an alert to end user and trigger an immediate action to reset the running configuration to the golden configuration in the target DD. This end-to-end automatic handling of configuration drift by pushing changes to non-compliant systems can greatly help users maintain the integrity of their data storage systems.

Embodiments thus provide a method of performing configuration drift handling that greatly improves on existing approaches of manual text comparison between two configurations. Embodiments described herein provide an automated way of assessing the configuration drift between the two configurations by using optimal transport for configuration drift, and a ranking of backup systems based on the severity of configuration drift.

An optimal transport algorithm is used as a mathematical framework that ties correspondence between instances of two datasets and distance between datasets as a whole themselves in a unified approach. The optimal transport algorithm is combined with Wasserstein distance to handle cases when axes are not in direct correspondence to ensure that even if the axes rotate, the distance calculation between the data points does not break as it is calculated based on the context of the data point. This can be easily scalable by using Gaussian approximation as Wasserstein distance with Gaussian distributions has a closed form solution and hence no optimization is needed in this case. It has feasibility to provide upper/lower bounds that can let us estimate the confidence intervals around the distance; can compare configuration datasets even if labels are different; is efficient and model-agnostic; and compares 'relations' instead of absolute positions.

As described above, in an embodiment, system 100 processes that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 10:
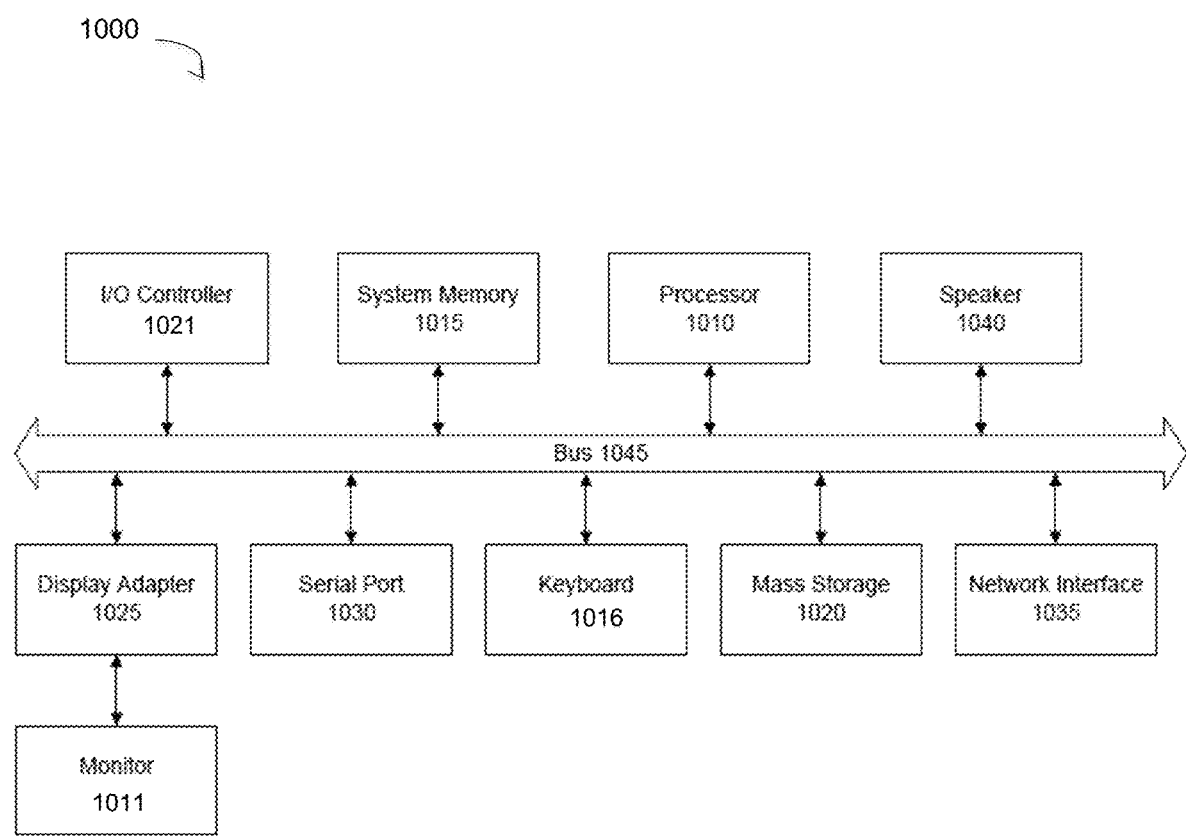
FIG. 10 is a block diagram of a computer system used to execute one or more software components of a system for performing some of the processor-based functions, under some embodiments.

FIG. 10 is a block diagram of a computer system used to execute one or more software components of a system for performing some of the processor-based functions, under some embodiments. The computer system 1000 includes a monitor 1011, keyboard 1016, and mass storage devices 1022. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is but one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of handling configuration drift in a data storage system having a plurality of storage nodes, comprising:
   defining a golden configuration dataset for the data storage system;
   obtaining a current configuration dataset of each storage node of the plurality of storage nodes, each of the golden and configuration datasets comprising a plurality of sentences defining a node configuration parameter;
   determining a distance between each sentence of the golden configuration dataset with each other sentence of the current configuration datasets for each of the plurality of storage nodes by creating a probability distribution of all sentence embeddings in the n-dimensional space using an unsupervised clustering technique, generating probability distributions for each of the golden configuration dataset and current configuration datasets, and creating, for each probability distribution, a distance matrix representing a pair-wise distance between each point and every other point in the probability distribution;
   ranking each node based on a distance of its sentences with the golden configuration dataset;
   performing an action on a corresponding node based on its respective ranking;
   embedding every sentence as a vector in n-dimensional space wherein every sentence has a point value representing its position relative to all other sentences, and further wherein a distance corresponds to a measure of closeness between two sentences.

2. The method of claim 1 further comprising using a Bidirectional Encoder Representations from Transformers (BERT) process to create the probability distribution of all the sentence embeddings.

3. The method of claim 1 further comprising applying an optimal transport process to each pair of probability distributions to identify contextual configuration drift therebetween.

4. The method of claim 3 further comprising applying a Wasserstein distance technique to the optimal transport process to compensate for any misalignment of axes in the n-dimensional space.

5. The method of claim 4 further comprising:
   normalizing each distance matrix for a current configuration dataset of a respective node to the golden configuration dataset to a scale from zero to one; and
   generating a score for each node along the scale based on a respective distance matrix.

6. The method of claim 5 further comprising:
   defining one or more threshold values defining a relative severity of configuration drift along the scale;
   placing the score for each node along the scale relative to the threshold values; and
   triggering an automated response for the node based on a respective score for the node along the scale.

7. The method of claim 6 wherein the automated response comprises one of:
   take no action for scores below a first threshold value;
   generate an alert for scores between a first threshold value and a second threshold value; and
   push the golden configuration onto the current configuration for scores above the second threshold value.

* * * * *